(12) United States Patent
Grabill et al.

(10) Patent No.: US 11,321,490 B2
(45) Date of Patent: May 3, 2022

(54) PROTECTED ACCESS TO METADATA BASED ON PACKAGE MEMBERSHIP

(71) Applicant: salesforce.com, inc., San Francisco, CA (US)

(72) Inventors: Carolyn Leigh Grabill, San Francisco, CA (US); Avrom Irwin Roy-Faderman, Sunnyvale, CA (US); Seth Leger, Durham, NC (US); Mason Everett, Oakland, CA (US); Christian Carter, Portland, OR (US); Catherine Schell, San Francisco, CA (US); Andrew Slater, Raleigh, NC (US); Vladimir Gerasimov, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 211 days.

(21) Appl. No.: 16/567,944

(22) Filed: Sep. 11, 2019

(65) Prior Publication Data

US 2021/0073402 A1    Mar. 11, 2021

(51) Int. Cl.
*G06F 7/04*     (2006.01)
*G06F 21/62*    (2013.01)
*G06F 8/61*     (2018.01)

(52) U.S. Cl.
CPC .............. *G06F 21/629* (2013.01); *G06F 8/61* (2013.01)

(58) Field of Classification Search
CPC .... G06F 16/167; G06F 16/335; G06F 16/907; G06F 21/10; G06F 21/604; G06F 21/629; G06F 2221/2141

USPC .................... 717/120, 168, 174, 177; 726/30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Hoan H Tran
(74) *Attorney, Agent, or Firm* — Dergosits & Noah LLP; Todd A. Noah

(57) ABSTRACT

A system and method for protecting access to metadata based on package membership. The system creates at least one customized metadata type for a first software package and assigns a package protected access mode to control access to the at least one customized metadata type by respective components of one or more software packages. The system denies access to the at least one customized metadata type, according to the package protected access mode, by at least one component of a second software package that shares a namespace with the first software package.

20 Claims, 9 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,325,003 B2 * | 1/2008 | Blackwell ............... G06Q 10/10 |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,601,467 B2 * | 12/2013 | Hofhansl ................ G06F 8/65 717/177 |
| 8,646,103 B2 | 2/2014 | Jakobson et al. |
| 10,037,339 B1 * | 7/2018 | Kleinpeter ............ H04L 63/102 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobsen |
| 2009/0177744 A1 | 7/2009 | Marlow et al. |
| 2012/0233137 A1 | 9/2012 | Jakobsen et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2014/0359537 A1 | 12/2014 | Jakobsen et al. |
| 2015/0007050 A1 | 1/2015 | Jakobsen et al. |
| 2015/0095162 A1 | 4/2015 | Jakobson et al. |
| 2015/0172563 A1 | 6/2015 | Jakobson et al. |

* cited by examiner

PROTECTED ACCESS TO METADATA BASED ON PACKAGE MEMBERSHIP

TECHNICAL FIELD

The present disclosure relates generally to data protection and more specifically relates to managing access to customized metadata.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Organizations may develop software packages that can be pushed to customers or available to be licensed upon being downloaded from an application exchange store. Various access controls to components, data and objects in those software packages as desirable in order to maintain the integrity of the underlying code. Access controls further allow organizations to push out software upgrades with the confidence that an incompatibility between the upgrade version and the version currently in use by customers will not occur. Such incompatibility is likely to not occur since the code being upgraded will be free from customer manipulation and corruption due to the access controls defined by the developer organization.

In other contexts, organizations may share software packages—or collaborate in the development of software packages—with third parties, such as vendor organizations or contractor organizations. In this scenario, a greater level of granularity with respect to access controls to components, data and objects is desirable. That is, the organization may find it desirable to allow such third parties varying levels access to components, data and objects in software packages or software packages currently under development. Moreover, different levels of access controls are desirable on a per-third party basis, where one third party organization has access to different components, data and objects of various packages than another third party organization.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
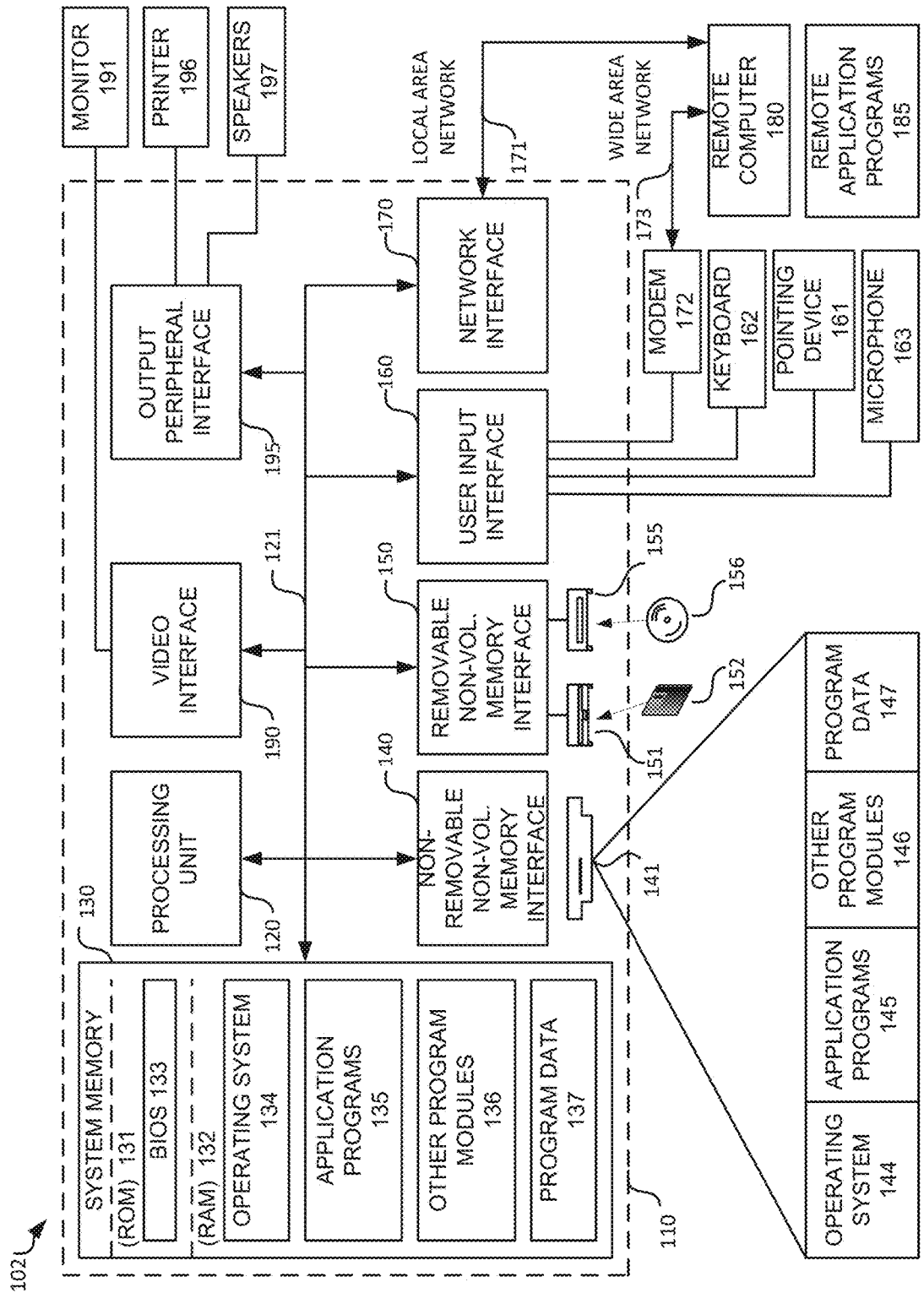
FIG. 1 shows a diagram of an example computing system that may be used with some embodiments.

In accordance with embodiments described herein, there are provided methods, systems and computer program products for protecting access to customized metadata based on package membership. A system creates at least one customized metadata type for a first software package. The system assigns, to the at least one customized metadata type, a package protected access mode to control access to the at least one customized metadata type by respective components of one or more software packages. The system denies access to the at least one customized metadata type, according to the package protected access mode, by at least one component of a second software package that shares a namespace with the first software package.

An on-demand database service may include an application platform which enables creation, management and execution of one or more applications developed by a provider of the on-demand database service, by one or more users accessing the on-demand database service via user systems, or by one or more application development organizations accessing the on-demand database service. An organization is a set or grouping of on-demand database service users and/or application developers. Multiple organizations may be related to each other or be completely separate from each other. A portion of an organization may overlap with a portion of another organization. An organization may use the application platform to create and manage one or more applications that can include one or more components, data types, data values, fields and objects. The one or more applications can be included in a software package which is pushed out to customers or onto the application platform to be made available for download and installation.

A unique namespace associated with the on-demand database service is assigned to an organization(s) that is developing software packages in order to differentiate between the components, data types, data values, and fields of software packages developed by other organizations. The use of various namespaces allows multiple organizations to develop components, data types, data values, and fields for their software packages that have the same (or similar) names. Since the similarly named components, data types, data values, and fields belong to different namespaces, they will not be identified as duplicates. Multiple organizations can share the same namespace to allow for collaboration in the development of a software package and may have access to the components, data types, data values, and fields included in the software packages that belong to the shared namespace.

An organization within a unique namespace may include customized metadata type values in a software package that are package protected. Package protection protects the customized metadata type values from being accessed by various organizations that have installed the first software package, even if those various organizations share an on-demand database service namespace with the organization that developed the software package. A package protected access mode assigned to the customized metadata type values provides stricter protection so that access to the customized metadata type values can be partitioned within the namespace itself. For example, customized metadata type values that are related to security management or encryption can be stored under a package protected access mode to prevent access by users from third party organizations that are co-developing software packages in the same namespace.

While one or more implementations and techniques are described herein with reference to an embodiment in which protected access to one or more custom metadata is based on package membership that is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
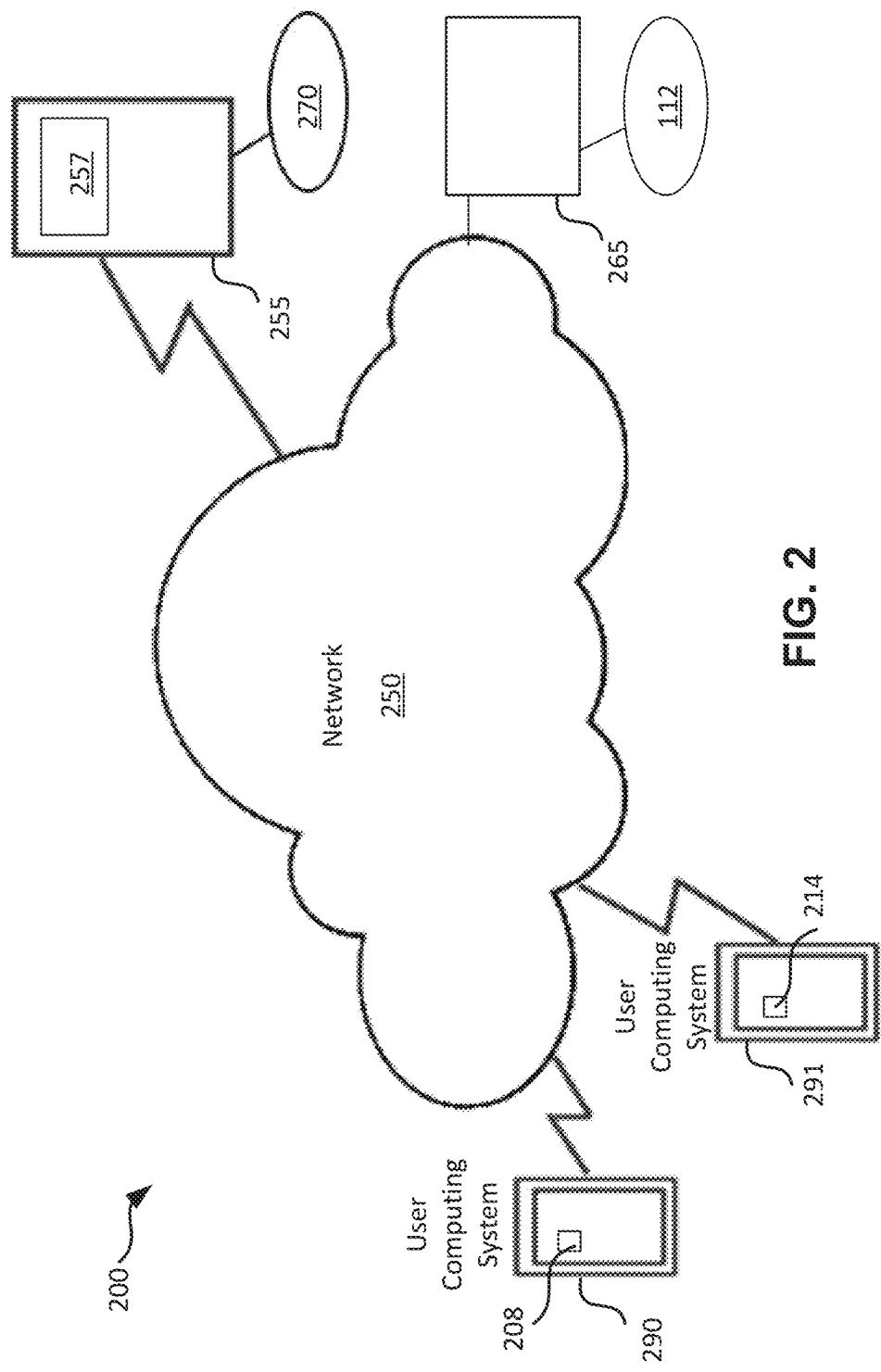
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 265 via the network 250.

Each of the computing systems 290 and 291 may include an application module such as module 208 or 214. For example, a user (e.g., a developer) may use the computing system 290 and the application module 208 to connect to and communicate with the server computing system 255 and log into application 257 (e.g., a Salesforce.com® application).

For some embodiments, the user may use the application 257 to develop, manage, install and execute a software package(s) with custom metadata having a package protected access mode and one or more of pre-processing and post-processing customized codes related to development, management, installation and execution of the software package(s) The pre-processing and post-processing customized codes may be executed by the server computing system 255. The development, management, installation and execution (or portions thereof) may be executed by the server computing system 265 associated with the server computing system 255. The server 265 may be associated with database 112. For example, the server computing system 265 may be configured to develop, manage, install and execute a software package(s) using a product of Salesforce.com.

Figure 3A:
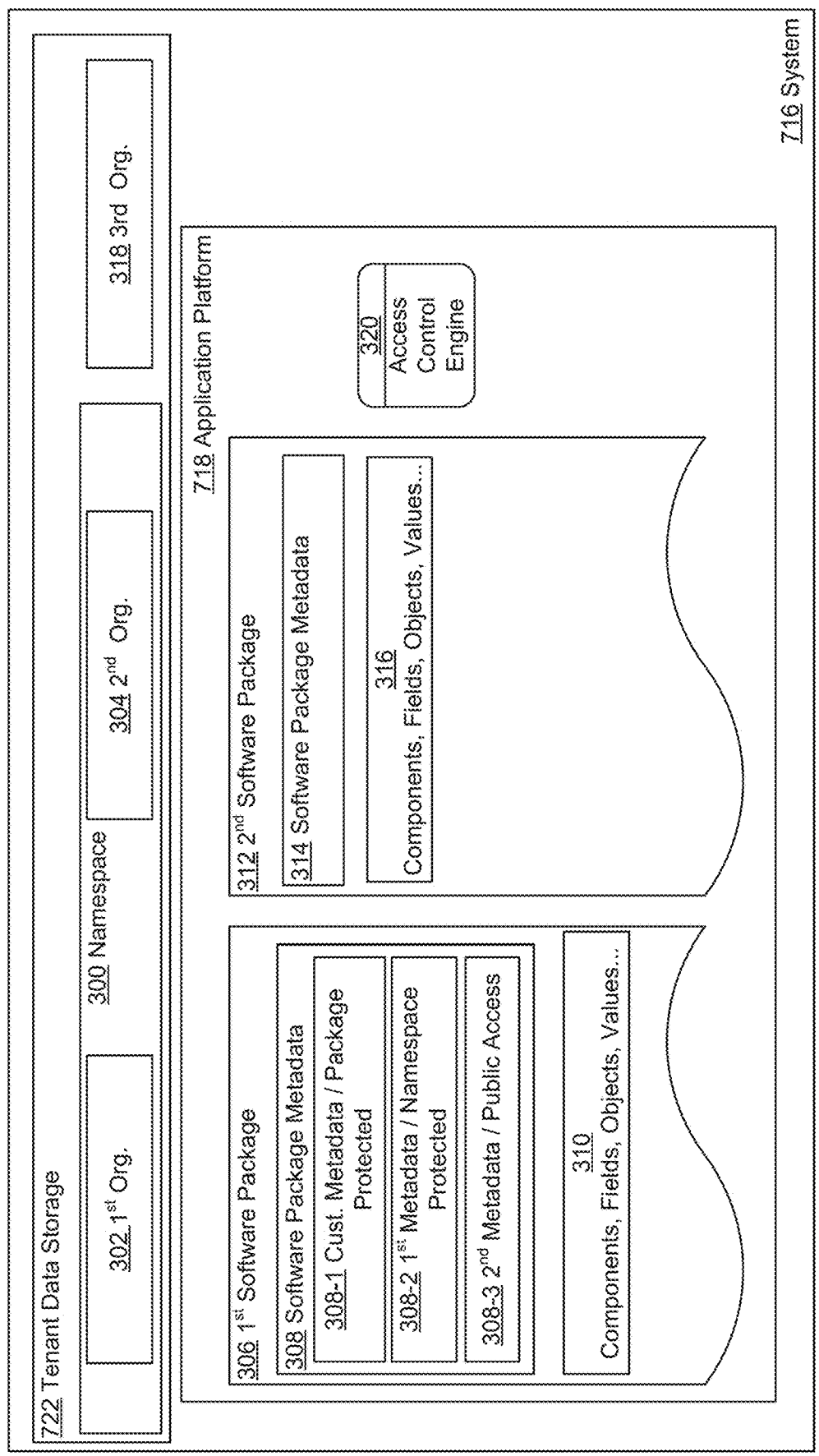
FIG. 3A is a high-level diagram of access control modes for metadata in a software package, in an embodiment.

FIG. 3A is a high-level diagram of various access control modes for metadata in a software package, in an embodiment. An on-demand database service includes an access control engine 320 for managing access to various types of metadata 308, 314 of a software package(s) 306, 312. The on-demand database service assigns a unique namespace 300 to be shared by multiple organizations, such as a first and second organization 302, 304. Multiple software packages that belong to the unique namespace 300, such as a first and second software package 306, 312, can be developed and managed by the first and second organizations 302, 304, either independently of each other or according to some degree of collaboration. For example, the first organization 302 develops the first software package 306 and includes customized metadata 308-1, first metadata 308-2 and second metadata 308-3 in the first software package 306. The access control engine 320 assigns various levels of protection to the customized metadata 308-1, first metadata 308-2 and the second metadata 308-3. The access control engine 320 assigns a package protected access mode to the customized metadata 308-1, a namespace protected access mode to the first metadata 308-2 and a public access mode to the second metadata 308-3. The first and second software packages 306, 312 further include their own components, fields, objects and values 310, 316. In addition to the first and second organizations 302, 304 that share a namespace 300, a third organization 318 can also be defined by the on-demand database service as being separate from the first and second organizations 302, 304 and outside the namespace 300.

It is understood that the access control engine can be a software module(s) that resides in any portion (or portions) of the on-demand database service. In addition, the access control engine (or any portion of the access control engine) can be implemented within respective downloaded and installed instances of software packages. For example, various portions of the access control engine can be distributed across the on-demand database service, software packages available on the application platform 718 and within downloaded and installed instances of software packages. In some embodiments, the access control engine (or any portion(s) of the access control engine) assigns access control modes to metadata, such as package protected, namespace protected and public access. The access control engine further determines whether incoming request to access metadata are valid or invalid based at least on the source software package associated with an incoming request.

Figure 3B:
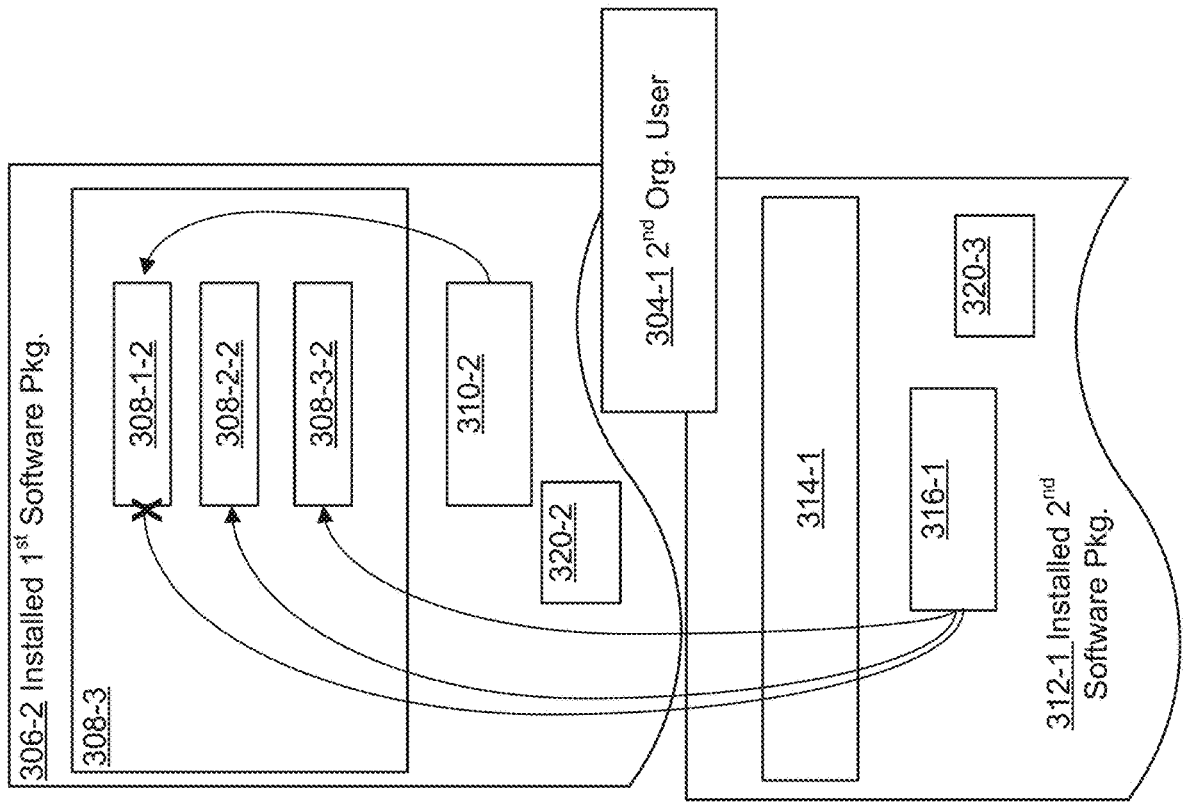
FIG. 3B is a high-level diagram of metadata with a package protected access mode, in an embodiment.
Figure 3B:
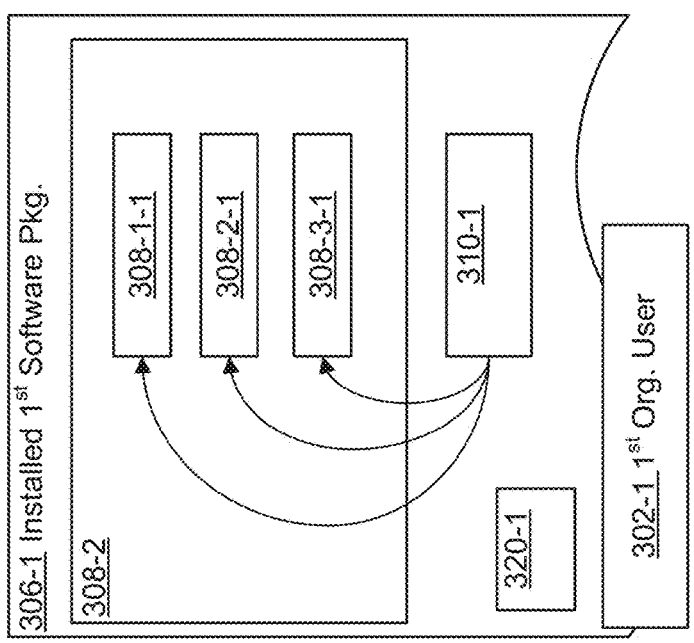

FIG. 3B is a high-level diagram of metadata with a package protected access mode, in an embodiment. As shown in FIG. 3B, a user associated with the first organization ("$1^{st}$ Org User") 302-1 has downloaded and installed an instance 306-1 of the first software package in relation to the $1^{st}$ Org User's 302-1 account in the on-demand database service. When the instance 306-1 of the first software package is executed, the instance's 306-1 components, fields, objects and values 310-1 ("instance code") will have access to all the instance metadata 308-2. The first software package instance 306-1 may include implemented portion(s) of the access control engine 320-1 to manage and control access to the metadata 308-2 according to assigned access control modes.

Since the customized metadata 308-1-1 is package protected, the instance code 310-1 can access the customized metadata 308-1-1 because the instance code 310-1 will be making access requests from within the first software package instance 306-1 itself. The instance code 310-1 can further access the first metadata 308-2-1 because the first metadata 308-2-1 is namespace protected and the first software package 306 was developed by an organization 302 in the corresponding namespace 300. Further, since the second metadata 308-3-1 has a public access mode, any software package can access the second metadata 208-3-1. As such, the instance code 310-1 will have access to the second metadata 308-3-1.

A user associated with the second organization ("$2^{nd}$ Org User") 304-1 has downloaded and installed an instance 306-2 of the first software package and an instance 312-1 of the second software package in relation to the $2^{nd}$ Org User's 304-1 account in the on-demand database service. When the instance 306-2 of the first software package ("first package instance") is executed, the first package instance's 306-2 components, fields, objects and values 310-2 ("first instance code") will have access to the instance metadata 308-3 due to the package protected access mode. When the instance 312-1 of the second software package is executed, the instance's 312-1 components, fields, objects and values 316-1 ("second instance code") will have access to some of the first package instance's metadata 308-3. The second software package instance 312-1 ("second package instance") also has metadata 314-1 of its own. The first and second package instances 306-2, 312-1 may include respective implemented portion(s) of the access control engine 320-2, 320-3 to manage and control access to the respective metadata 308-3, 314-1 according to assigned access control modes.

Instance code 316-1 of the second package instance 312-1 installed by the $2^{nd}$ Org User 304-1 will not be able to access the customized metadata 308-1-2 of the first package instance 308-3 because the access requests will be coming from outside the first package instance 308-3, even though the first and second package instances 306-3, 312-1 are based on software packages 306, 312 developed by organizations 302, 304 that share the same namespace 300. However, the instance code 316-1 of the second package instance 312-1 installed by the $2^{nd}$ Org User 304-1 can further access the first metadata 308-2-2 of the first package instance 306-2 because the first metadata 308-2-2 is namespace protected and the first and second package instances 306-2, 312-1 are based on software packages 306, 312 from the same namespace 300. Further, since the second metadata 308-3-2 of the first package instance 306-2 has a public access mode, any software package can access the second metadata 208-3-2 and the instance code 316-1 will have access to the second metadata 308-3-2.

Figure 4:
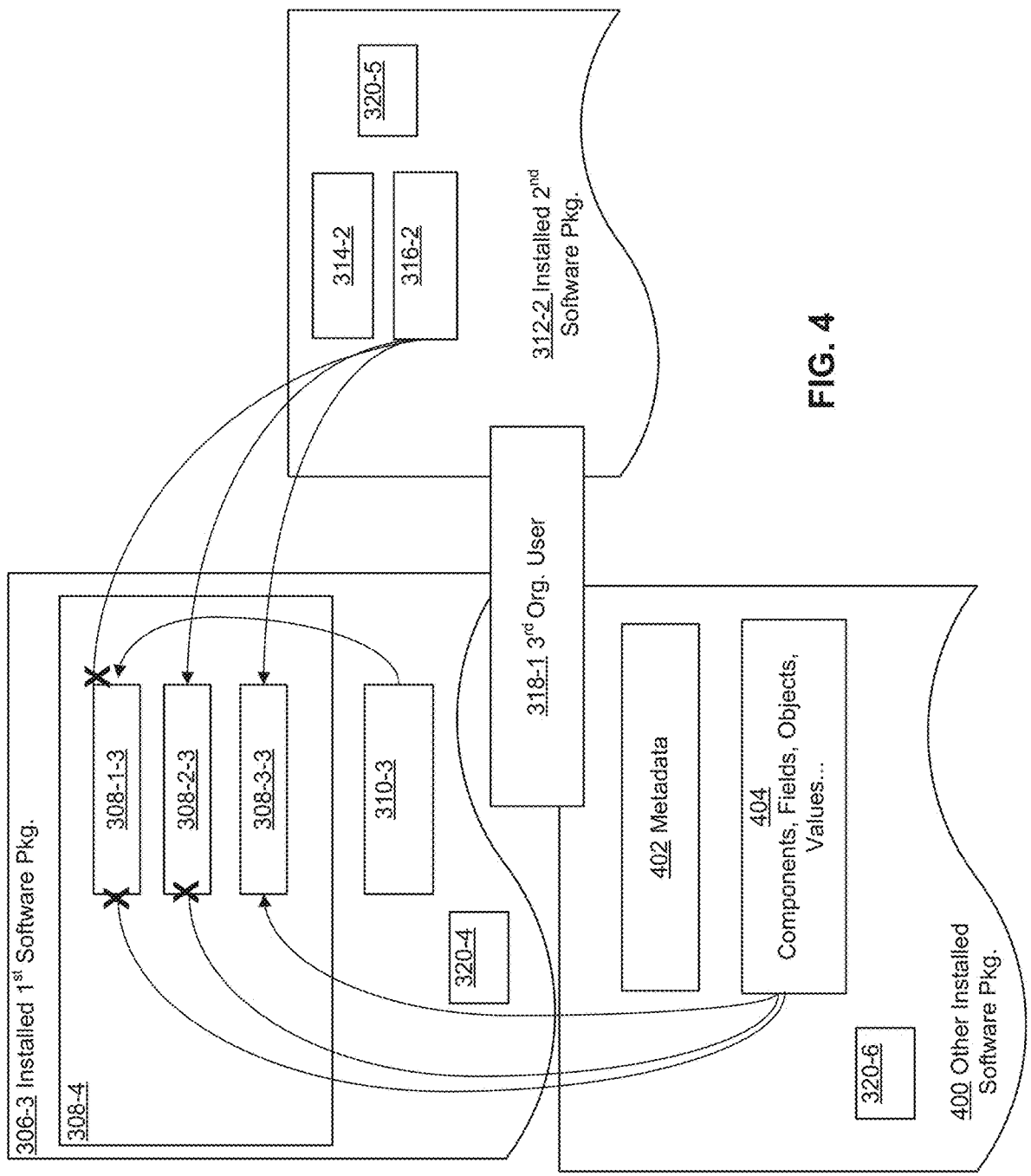
FIG. 4 is a high-level diagram of metadata with a package protected access mode, in an embodiment.

FIG. 4 is a high-level diagram of metadata with a package protected access mode, in an embodiment. As shown in FIG. 4, a user associated with the third organization ("$3^{rd}$ Org User") 318-1 has downloaded and installed an instance 306-3 of the first software package, an instance 312-2 of the second software package and an instance 400 of another software package in relation to the $3^{rd}$ Org User's 318-1 account in the on-demand database service. As shown in FIG. 3A, the third organization 318 does not share the namespace 300 with the first and second organizations 302, 304. When the instance 306-3 of the first software package is executed, the instance's 306-3 components, fields, objects and values 310-3 ("instance code") will have access to all the instance metadata 308-4. Since the customized metadata 308-1-3 is package protected, the instance code 310-3 of first software package instance 306-3 installed by the $3^{rd}$ Org User 318-1 can access the customized metadata 308-1-3 because the instance code 310-3 will be making access requests from within the first software package instance 306-3 itself. The first software package instance 306-3 may include implemented portion(s) of the access control engine 320-4 to manage and control access to the metadata 308-4 according to assigned access control modes.

When the instance 312-2 of the second software package installed by the $3^{rd}$ Org User 318-1 is executed, the instance's 312-2 components, fields, objects and values 316-2 ("second instance code") will have access to some of the metadata 308-4 of the instance 306-3 of the first software package installed by the $3^{rd}$ Org User 318-1. The second software package instance 312-2 ("second package instance") also has metadata 314-2 of its own. The $3^{rd}$ Org User's 318-1 second software package instance 312-2 also includes respective implemented portion(s) of the access control engine 320-5 to manage and control access to the metadata 314-2 according to assigned access control modes.

Since the customized metadata 308-1-3 of the first package instance 306-3 is package protected, the instance code 316-2 of the second package instance 312-2 installed by the $3^{rd}$ Org User 318 will not be able to access the customized metadata 308-1-3 because the access requests will be coming from outside the first package instance 306-3, even though the first and second package instances 306-3, 312-2 are based on software packages 306, 312 developed by organizations 302, 304 that share the same namespace 300.

The instance code 316-2 of the second package instance 312-2 installed by the 3$^{rd}$ Org User 318-1 can further access the first metadata 308-2-3 because the first metadata 308-2-3 is namespace protected and the first and second package instances 306-3, 312-2 are based on software packages 306, 312 from the same namespace 300. Further, since the second metadata 308-3-3 of the first package instance 306-3 has a public access mode, any software package can access the second metadata 308-3-3 and the instance code 316-2 of the second package instance 312-2 will have access to the second metadata 308-3-3.

The 3$^{rd}$ Org User 318-1 has also downloaded and installed an instance 400 of another software package ("other instance"). The other instance is based on a software package that was not developed by the first and second organizations 302, 304. The other instance 400 has its own components, fields, objects and values 404 ("other instance code") and metadata 402 ("other metadata"). The other instance 400 also includes respective implemented portion(s) of the access control engine 320-6 to manage and control access to the other metadata 402 according to assigned access control modes.

Since the customized metadata 308-1-3 is package protected, the other instance code 404 will not be able to access the customized metadata 308-1-3 because the access requests will be coming from outside the first package instance 306-3. The other instance code 404 will also not be able to access the first metadata 308-2-3 of the first package instance 306-3 because the other instance 400 is based on a software package developed by an organization that does not share the same namespace 300 as the first and second organizations 302, 304 and because the first metadata 308-2-3 is namespace protected. Since the second metadata 308-3-3 has a public access mode, any software package can access the second metadata 308-3-3 and the other instance code 404 will have access to the second metadata 308-3-3.

Figure 5:
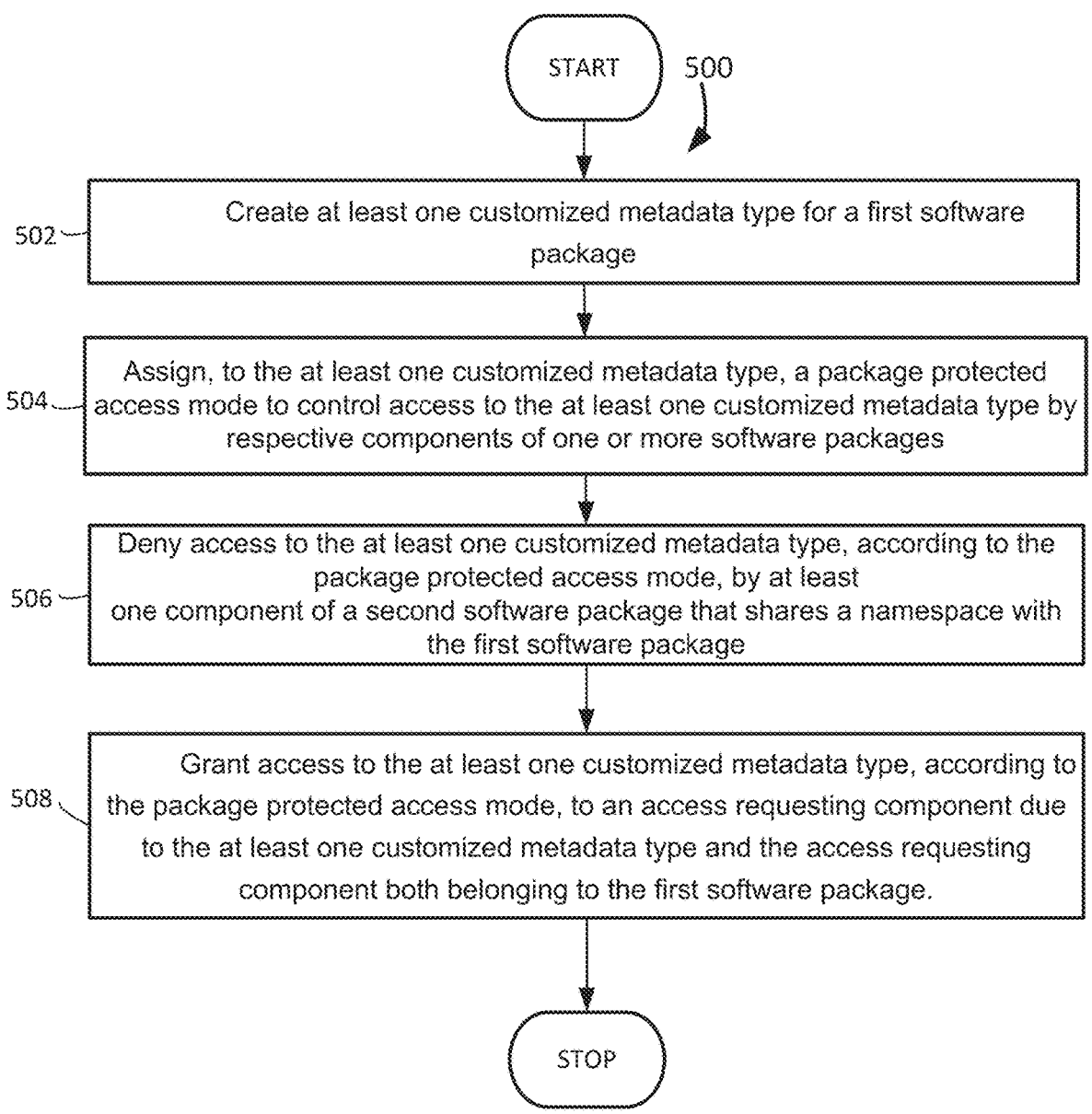
FIG. 5 is an operational flow diagram illustrating a high-level overview of a method for protecting access to customized metadata based on package membership, in an embodiment.

FIG. 5 is an operational flow diagram 500 illustrating a high-level overview of a method for protecting access to customized metadata based on package membership, in an embodiment.

At step 502, the access control engine creates at least one customized metadata type for a first software package. The customized metadata may be declarative customized metadata, such as lists, enumerations of values, relational data, naming rules for organizations, and mappings to codes (such as discount codes for use during purchase in each U.S. state). In another example, declarative customized metadata can be the engine rules for a package implementation engine of a software package.

At step 504, the access control engine assigns, to the at least one customized metadata type, a package protected access mode to control access to the at least one customized metadata type by respective components of one or more software packages. The package protected access mode prevents users who have downloaded and are using an application associated with the first software package from accessing, viewing, editing or upgrading the customized metadata.

At step 506, the access control engine denies access to the at least one customized metadata type, according to the package protected access mode, by at least one component of a second software package that shares a namespace with the first software package.

At step 508, the access control engine grants access to the at least one customized metadata type, according to the package protected access mode, to an access requesting component due to the at least one customized metadata type and the access requesting component both belonging to the first software package.

The package protected access mode thereby ensures that access to the customized metadata occurs as result of access requests made from within the first software package, such that only components or objects of the first software package can be used for accessing, viewing, editing or upgrading the customized metadata.

According to an example embodiment, the customized metadata, with the package protected access mode, of the first software package can be an Application Program Interface key ("API key") that is used to contact an API external to the first software package and the external to the first organization that created the first software package. The API key can be defined to contact the external API, or make requests to the external API, according to customized metadata rules at pre-defined intervals, pre-defined times or when a pre-defined condition is met. The package protected access mode can further define validation or authorization requirements to prevent users from within the first organization (or from within any other organization) from accessing the customized metadata as well. That is, users of the first software package in the first organization may have to first be authenticated before accessing the API key and rules in the customized metadata.

In another example embodiment, the customized metadata, with the package protected access mode, of a corresponding software package can include a social network API key for contacting an API of an external social network in order to post information on a social network feed. The customized metadata further includes rules as to when the social network API is contacted. When a user of an application of the corresponding software package creates an event or meets a condition defined by a customized metadata rule, the social network API key is triggered. Other customized metadata rules may define what type of data—or user data—can be sent from the application to the external social network. If the application of the corresponding software package is an online game, the social network API key may be triggered when a user reaches a certain level in the game and the customized metadata rules further define which type of user data and online game information will be posted on a social network feed. It is understood that the API key is not limited to contacting external social networks and that the customized metadata can be an API key for contacting any type of API.

Figure 6:
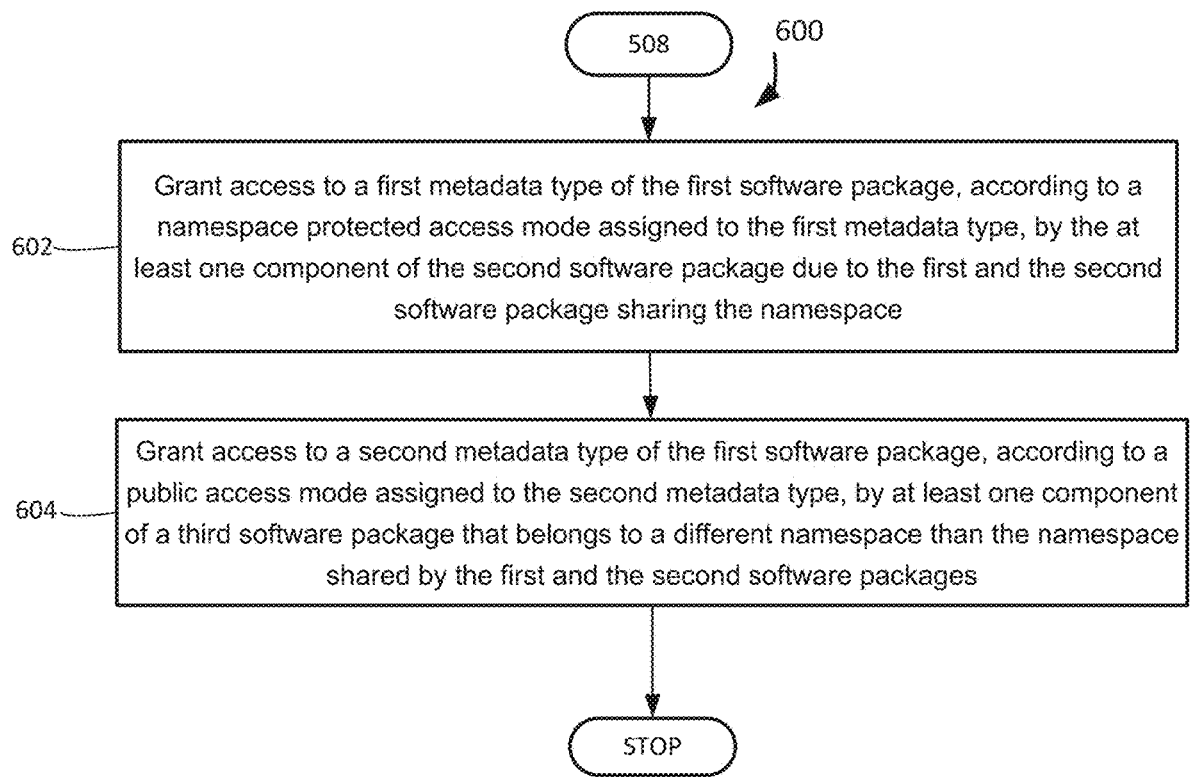
FIG. 6 is an operational flow diagram illustrating a high-level overview of a method for protecting access to customized metadata based on package membership, in an embodiment.

FIG. 6 is an operational flow diagram 600 illustrating a high-level overview of a method for protecting access to customized metadata based on package membership, in an embodiment.

At step 602, the access control engine grants access to a first metadata type of the first software package, according to a namespace protected access mode assigned to the first metadata type, by the at least one component of the second software package due to the first and the second software package sharing the namespace. Since the first metadata is namespace protected, components or objects of the second software package can be used for accessing, viewing, editing or upgrading the first metadata. However, the components or objects of the second software package cannot access the customized metadata even though the first and second software packages belong to the same namespace.

At step 604, the access control engine grants access to a second metadata type of the first software package, according to a public access mode assigned to the second metadata type, by at least one component of a third software package that belongs to a different namespace than the namespace shared by the first and the second software packages. The second metadata can be accessed via the third software package due to the assigned public access mode, which allows for software packages within and outside of the namespace access to the second metadata of the first software package.

System Overview

Figure 7:
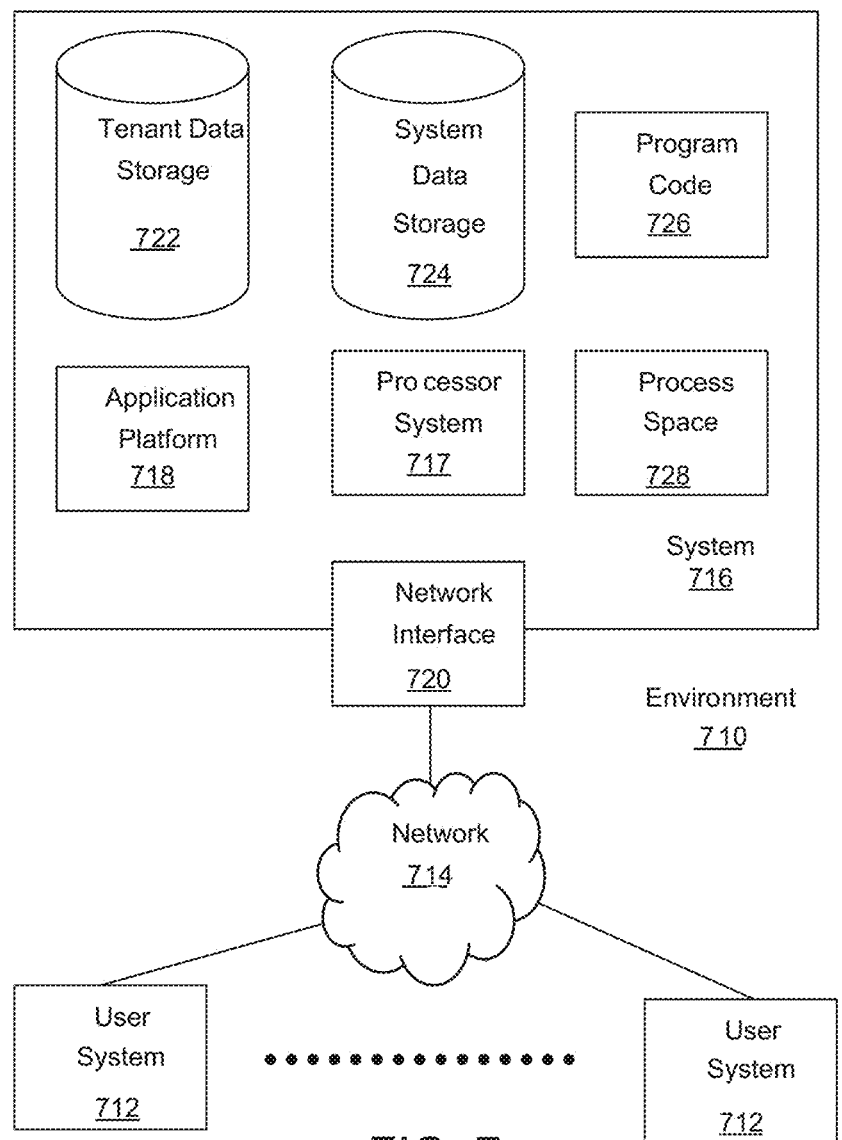
FIG. 7 illustrates a block diagram of an example of an environment wherein an on-demand database service might be used.

FIG. 7 illustrates a block diagram of an environment 710 wherein an on-demand database service might be used. The environment 710 may include user system(s) 712, a network 714, a system 716, a processor system 717, an application platform 718, a network interface 720, a tenant data storage 722, a system data storage 724, program code 726, and a process space 728. In other embodiments, the environment 710 may not have all of the components listed and/or may have other elements instead of, or in addition to, those listed above.

The environment 710 is an environment in which an on-demand database service exists. A user system 712 may be any machine or system that is used by a user to access a database user system. For example, any of the user systems 712 may be a handheld computing device, a mobile phone, a laptop computer, a work station, and/or a network of computing devices. As illustrated in FIG. 7 (and in more detail in FIG. 8) the user systems 712 might interact via the network 714 with an on-demand database service, which is the system 716.

An on-demand database service, such as the system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 716" and the "system 716" will be used interchangeably herein. A database image may include one or more database objects. A relational database management system (RDMS) or the equivalent may execute storage and retrieval of information against the database object(s). The application platform 718 may be a framework that allows the applications of the system 716 to run, such as the hardware and/or software, e.g., the operating system. In an embodiment, the on-demand database service 716 may include the application platform 718 which enables creation, managing and executing one or more applications developed by the provider of the on-demand database service, users accessing the on-demand database service via user systems 712, or third-party application developers accessing the on-demand database service via the user systems 712.

The users of the user systems 712 may differ in their respective capacities, and the capacity of a particular user system 712 might be entirely determined by permissions (permission levels) for the current user. For example, where a salesperson is using a particular user system 712 to interact with the system 716, that user system 712 has the capacities allotted to that salesperson. However, while an administrator is using that user system 712 to interact with the system 716, that user system 712 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 714 is any network or combination of networks of devices that communicate with one another. For example, the network 714 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 712 might communicate with the system 716 using TCP/IP and, at a higher network level, use other common Internet protocols to communicate, such as HTTP, FTP, AFS, WAP, etc. In an example where HTTP is used, the user systems 712 might include an HTTP client commonly referred to as a "browser" for sending and receiving HTTP messages to and from an HTTP server at the system 716. Such an HTTP server might be implemented as the sole network interface between the system 716 and the network 714, but other techniques might be used as well or instead. In some implementations, the interface between the system 716 and the network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 716, shown in FIG. 7, implements a web-based customer relationship management (CRM) system. For example, in one embodiment, the system 716 includes application servers configured to implement and execute CRM software applications as well as provide related data, code, forms, webpages and other information to and from the user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 716 implements applications other than, or in addition to, a CRM application. For example, the system 716 may provide tenant access to multiple hosted (standard and custom) applications, including a CRM application. User (or third-party developer) applications, which may or may not include CRM, may be supported by the application platform 718, which manages creation, storage of the applications into one or more database objects and executing of the applications in a virtual machine in the process space of the system 716.

One arrangement for elements of the system 716 is shown in FIG. 7, including the network interface 720, the application platform 718, the tenant data storage 722 for tenant data 723, the system data storage 724 for system data 725 accessible to the system 716 and possibly multiple tenants, the program code 726 for implementing various functions of the system 716, and the process space 728 for executing MTS system processes and tenant-specific processes, such as running applications as part of an application hosting service. Additional processes that may execute on the system 716 include database indexing processes.

Several elements in the system shown in FIG. 7 include conventional, well-known elements that are explained only briefly here. For example, each of the user systems 712 could include a desktop personal computer, workstation, laptop, PDA, cell phone, or any wireless access protocol (WAP) enabled device or any other computing device capable of interfacing directly or indirectly to the Internet or other network connection. Each of the user systems 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 712 to access, process and view information, pages and applications available to it from the system 716 over the network 714. Each of the user systems 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 716 or other systems or servers. For example, the user interface device may be used to access data and applications hosted by the system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 712 and all of its components are operator configurable using applications, such as a browser, including computer code run using a central processing unit such as an Intel Pentium® processor or the like. Similarly, the system 716 (and additional instances of an MTS, where more than one is present) and all of their components might be operator configurable using application(s) including computer code to run using a central processing unit such as the processor system 717, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 716 is configured to provide webpages, forms, applications, data and media content to the user (client) systems 712 to support the access by the user systems 712 as tenants of the system 716. As such, the system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 8:
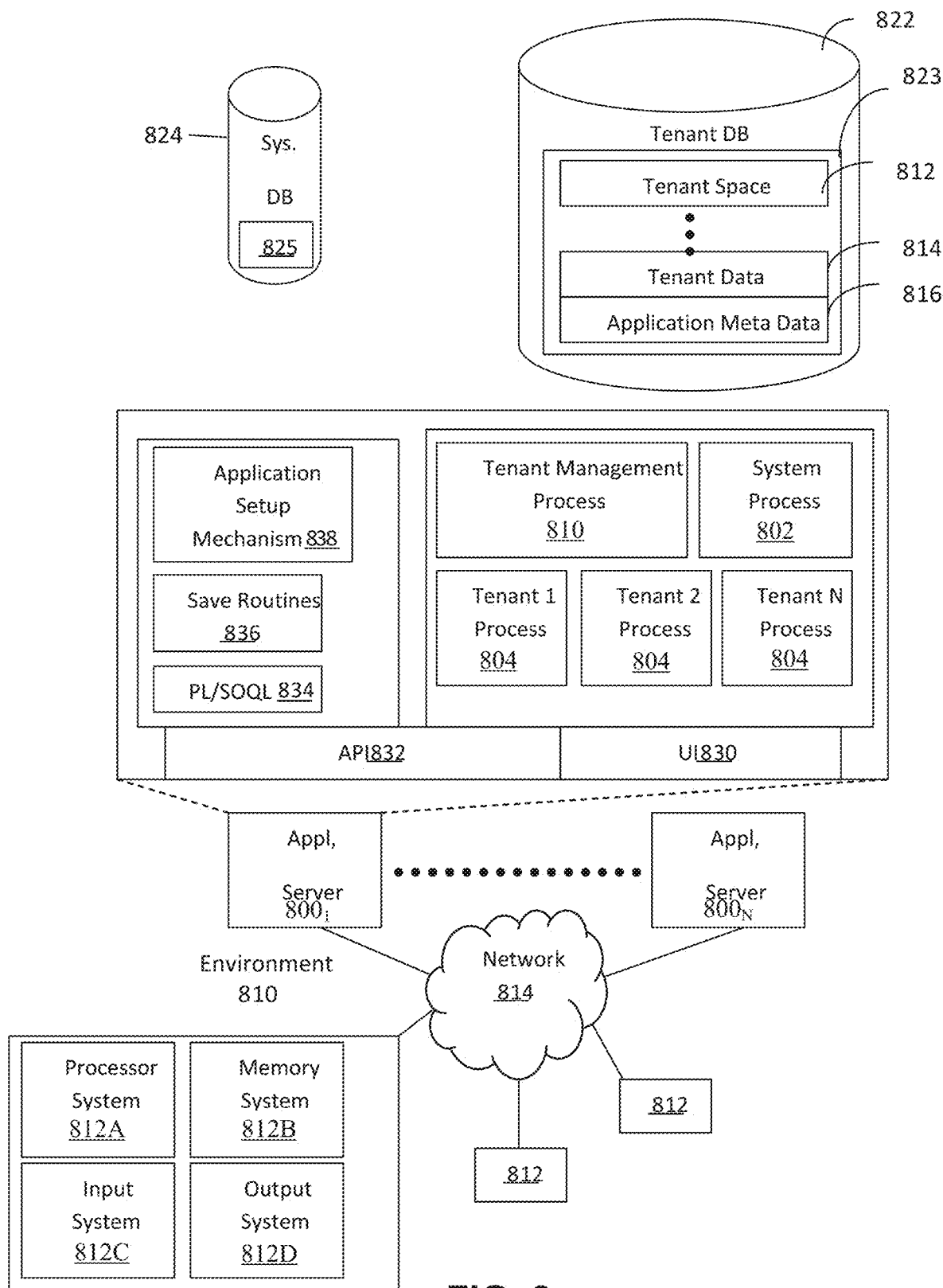
FIG. 8 illustrates a block diagram of an embodiment of elements of FIG. 7 and various possible interconnections between these elements.

FIG. 8 also illustrates the environment 810. However, in FIG. 8 elements of the system 716 and various interconnections in an embodiment are further illustrated. FIG. 8 shows that the each of the user systems 812 may include a processor system 812A, a memory system 812B, an input system 812C, and an output system 812D. FIG. 8 shows the network 814 and also shows that the system 716 may include the tenant data storage 822, the tenant data 823, the system data storage 824, the system data 825, a User Interface (UI) 830, an Application Program Interface (API) 832, a PL/SOQL 834, save routines 836, an application setup mechanism 838, applications servers $800_1$-$800_N$, a system process space 802, tenant process spaces 804, a tenant management process space 810, a tenant storage area 812, a user storage (or tenant data) 814, and application metadata 816. In other embodiments, the environment 810 may not have the same elements as those listed above and/or may have other elements instead of, or in addition to, those listed above.

The user systems 712, the network 714, the system 716, the tenant data storage 722, and the system data storage 724 were discussed above in FIG. 7. Regarding the user systems 812, the processor system 812A may be any combination of one or more processors. The memory system 812B may be any combination of one or more memory devices, short term, and/or long-term memory. The input system 812C may be any combination of input devices, such as one or more keyboards, mice, trackballs, scanners, cameras, and/or interfaces to networks. The output system 812D may be any combination of output devices, such as one or more monitors, printers, and/or interfaces to networks. As shown by FIG. 7, the system 716 may include the network interface 720 implemented as a set of HTTP application servers 800, the application platform 718, the tenant data storage 722, and the system data storage 724. Also shown is the system process space 802, including individual tenant process spaces 804 and the tenant management process space 810. Each application server 800 may be configured to access tenant data storage 722 and the tenant data 823 therein, and the system data storage 724 and the system data 825 therein to serve requests of the user systems 712. The tenant data 823 might be divided into individual tenant storage areas 812, which may be either a physical arrangement and/or a logical arrangement of data. Within each tenant storage area 812, the user storage 814 and the application metadata 816 might be similarly allocated for each user. For example, a copy of a user's most recently used (MRU) items might be stored to the user storage 814. Similarly, a copy of MRU items for an entire organization that is a tenant might be stored to the tenant storage area 812. The UI 830 provides a user interface and the API 832 provides an application programmer interface to the system 716 resident processes to users and/or developers at the user systems 712. The tenant data and the system data may be stored in various databases, such as one or more Oracle™ databases.

The application platform 718 includes the application setup mechanism 838 that supports application developers' creation and management of applications, which may be saved as metadata into the tenant data storage 722 by the save routines 836 for execution by subscribers as one or more tenant process spaces 804 managed by the tenant management process 810 for example. Invocations to such applications may be coded using the PL/SOQL 834 that provides a programming language style interface extension to the API 832. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 816 for the subscriber making the invocation and executing the metadata as an application in a virtual machine.

Each application server 800 may be communicably coupled to database systems, e.g., having access to the system data 825 and the tenant data 823, via a different network connection. For example, one application server $800_1$ might be coupled via the network 814 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also may be used. For example, in certain embodiments, three consecutive requests from the same user could hit three different application servers 800, and three requests from different users could hit the same application server 800. In this manner, the system 716 is multi-tenant, wherein the system 716 handles storage of, and access to, different objects, data and applications across disparate users and organizations.

As an example of storage, one tenant might be a company that employs a sales force where each salesperson uses the system 716 to manage their sales process. Thus, a user might maintain contact data, leads data, customer follow-up data, performance data, goals and progress data, etc., all applicable to that user's personal sales process (e.g., in the tenant data storage 722). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 716 might also maintain system level data usable by multiple tenants or other data. Such system level data might include industry reports, news, postings, and the like that are sharable among tenants.

In certain embodiments, the user systems 712 (which may be client systems) communicate with the application servers 800 to request and update system-level and tenant-level data from the system 716 that may require sending one or more queries to the tenant data storage 722 and/or the system data storage 724. The system 716 (e.g., an application server 800 in the system 716) automatically generates one or more SQL statements (e.g., one or more SQL queries) that are designed to access the desired information. The system data storage 724 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for protecting access to metadata based on package membership comprising:
creating, by a database system, at least one customized metadata type for a first software package;
assigning to the at least one customized metadata type by the database system, a package protected access mode to control access to the at least one customized metadata type by respective components of one or more software packages; and
denying, by the database system, access to the at least one customized metadata type, according to the package protected access mode, by at least one component of a second software package that shares a namespace with the first software package.

2. The method of claim 1, further comprising:
granting access to the at least one customized metadata type, according to the package protected access mode, to an access requesting component due to the at least one customized metadata type and the access requesting component both belonging to the first software package.

3. The method of claim 2, wherein granting access to the at least one customized metadata type further comprises validating, according to a unique package identifier of the access requesting component, that the requesting component belongs to the first software package.

4. The method of claim 1, wherein the first software package is developed by a first organization that is different than a second organization that developed the second software package.

5. The method of claim 1, further comprising:
granting access to a first metadata type of the first software package, according to a namespace protected access mode assigned to the first metadata type, by the at least one component of the second software package due to the first and the second software package sharing the namespace.

6. The method of claim 5, further comprising:
granting access to a second metadata type of the first software package, according to a public access mode assigned to the second metadata type, by at least one component of a third software package that belongs to a different namespace than the namespace shared by the first and the second software packages.

7. The method of claim 1, wherein the at least one customized metadata type comprises customized declarative metadata of the first software package and wherein the namespace is a unique namespace in an on-demand database service that provides an application exchange platform for creating, distributing and managing the first and the second software packages.

8. A computer program product comprising computer-readable program code to be executed by one or more processors when retrieved from a non-transitory computer-readable medium, the program code including instructions to:
creating at least one customized metadata type for a first software package;
assigning, to the at least one customized metadata type, a package protected access mode to control access to the at least one customized metadata type by respective components of one or more software packages; and
denying access to the at least one customized metadata type, according to the package protected access mode, by at least one component of a second software package that shares a namespace with the first software package.

9. The computer program product of claim 8, further comprising:
granting access to the at least one customized metadata type, according to the package protected access mode, to an access requesting component due to the at least one customized metadata type and the access requesting component both belonging to the first software package.

10. The computer program product of claim 9, wherein granting access to the at least one customized metadata type further comprises validating, according to a unique package identifier of the access requesting component, that the requesting component belongs to the first software package.

11. The computer program product of claim 8, wherein the first software package is developed by a first organization that is different than a second organization that developed the second software package.

12. The computer program product of claim 8, further comprising:
  granting access to a first metadata type of the first software package, according to a namespace protected access mode assigned to the first metadata type, by the at least one component of the second software package due to the first and the second software package sharing the namespace.

13. The computer program product of claim 12, further comprising:
  granting access to a second metadata type of the first software package, according to a public access mode assigned to the second metadata type, by at least one component of a third software package that belongs to a different namespace than the namespace shared by the first and the second software packages.

14. The computer program product of claim 8, wherein the at least one customized metadata type comprises customized declarative metadata of the first software package and wherein the namespace is a unique namespace in an on-demand database service that provides an application exchange platform for creating, distributing and managing the first and the second software packages.

15. A system for protecting access to metadata based on package membership comprising:
  one or more processors; and
  a non-transitory computer readable medium storing a plurality of instructions, which when executed, cause the one or more processors to:
  creating at least one customized metadata type for a first software package;
  assigning, to the at least one customized metadata type, a package protected access mode to control access to the at least one customized metadata type by respective components of one or more software packages; and
  denying access to the at least one customized metadata type, according to the package protected access mode, by at least one component of a second software package that shares a namespace with the first software package.

16. The system of claim 15, further comprising:
  granting access to the at least one customized metadata type, according to the package protected access mode, to an access requesting component due to the at least one customized metadata type and the access requesting component both belonging to the first software package.

17. The system of claim 16, wherein granting access to the at least one customized metadata type further comprises validating, according to a unique package identifier of the access requesting component, that the requesting component belongs to the first software package.

18. The system of claim 15, wherein the first software package is developed by a first organization that is different than a second organization that developed the second software package.

19. The system of claim 15, further comprising:
  granting access to a first metadata type of the first software package, according to a namespace protected access mode assigned to the first metadata type, by the at least one component of the second software package due to the first and the second software package sharing the namespace.

20. The system of claim 19, further comprising:
  granting access to a second metadata type of the first software package, according to a public access mode assigned to the second metadata type, by at least one component of a third software package that belongs to a different namespace than the namespace shared by the first and the second software packages.

* * * * *